United States Patent
Gilbertson

(10) Patent No.: US 10,933,842 B2
(45) Date of Patent: Mar. 2, 2021

(54) ACTUATED SPRAYER SYSTEM

(71) Applicant: Waymo LLC, Mountain View, CA (US)

(72) Inventor: Seth Gilbertson, Dublin, CA (US)

(73) Assignee: Waymo LLC, Mountain View, CA (US)

( * ) Notice: Subject to any disclaimer, the term of this patent is extended or adjusted under 35 U.S.C. 154(b) by 79 days.

(21) Appl. No.: 16/216,120

(22) Filed: Dec. 11, 2018

(65) Prior Publication Data

US 2020/0180563 A1      Jun. 11, 2020

(51) Int. Cl.
| | |
|---|---|
| *B05B 1/02* | (2006.01) |
| *B05B 15/72* | (2018.01) |
| *B08B 3/02* | (2006.01) |
| *B60R 11/04* | (2006.01) |
| *B60S 1/08* | (2006.01) |
| *B60S 1/52* | (2006.01) |
| *B60S 1/54* | (2006.01) |
| *B60S 1/56* | (2006.01) |
| *G02B 27/00* | (2006.01) |
| *H04N 5/217* | (2011.01) |

(52) U.S. Cl.
CPC ............ *B60S 1/0848* (2013.01); *B60S 1/528* (2013.01); *B60S 1/56* (2013.01); *B05B 1/02* (2013.01); *B05B 15/72* (2018.02); *B08B 3/02* (2013.01); *B60R 11/04* (2013.01); *B60S 1/54* (2013.01); *G02B 27/0006* (2013.01); *H04N 5/2171* (2013.01)

(58) Field of Classification Search
CPC .. B05B 1/02; B05B 15/72; B08B 3/02; B60R 11/04; B60S 1/0848; B60S 1/528; B60S 1/54; B60S 1/56; G02B 27/0006; H04N 5/2171
USPC ...... 15/250.001, 250.01, 250.27; 134/6, 198; 239/284.1, 284.2
See application file for complete search history.

(56) References Cited

U.S. PATENT DOCUMENTS

| | | |
|---|---|---|
| 6,234,410 B1 | 5/2001 | Martin et al. |
| 9,992,388 B2 | 6/2018 | Romack et al. |
| 2016/0121855 A1 | 5/2016 | Doorley et al. |
| 2017/0259789 A1 | 9/2017 | McAndrew |
| 2017/0313287 A1 | 11/2017 | Davies et al. |
| 2018/0015907 A1 | 1/2018 | Rice |
| 2018/0134258 A1 | 5/2018 | Ekola et al. |

FOREIGN PATENT DOCUMENTS

| | | |
|---|---|---|
| DE | 202018103489 U1 | 8/2018 |
| JP | 2015057338 A | 3/2015 |

OTHER PUBLICATIONS

International Search Report and Written Opinion for Application No. PCT/US2019/062421 dated Mar. 13, 2020.

*Primary Examiner* — Levon J Shahinian

(74) *Attorney, Agent, or Firm* — Botos Churchill IP Law

(57) ABSTRACT

This technology relates to system for clearing a sensor cover. The system may include a sprayer, a support, and a positioning device. The sprayer may be mounted to the support and direct a flow of fluid to the sensor cover. The positioning device may be configured to adjust the position of the sprayer on the support. The system may include a nozzle and the nozzle may be positioned to direct the flow of fluid to an area of the sensor cover. The system may include additional sprayers.

21 Claims, 14 Drawing Sheets

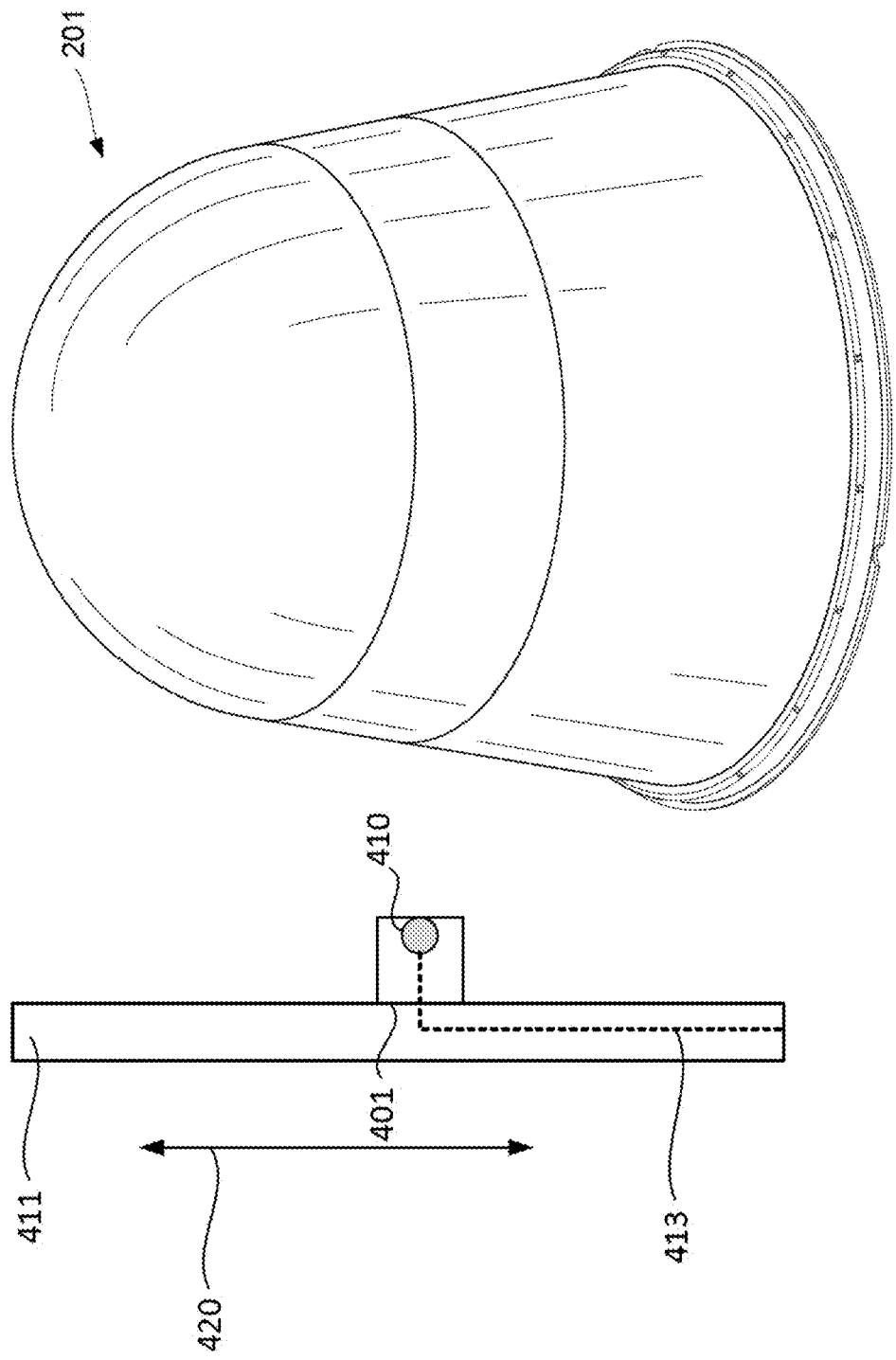

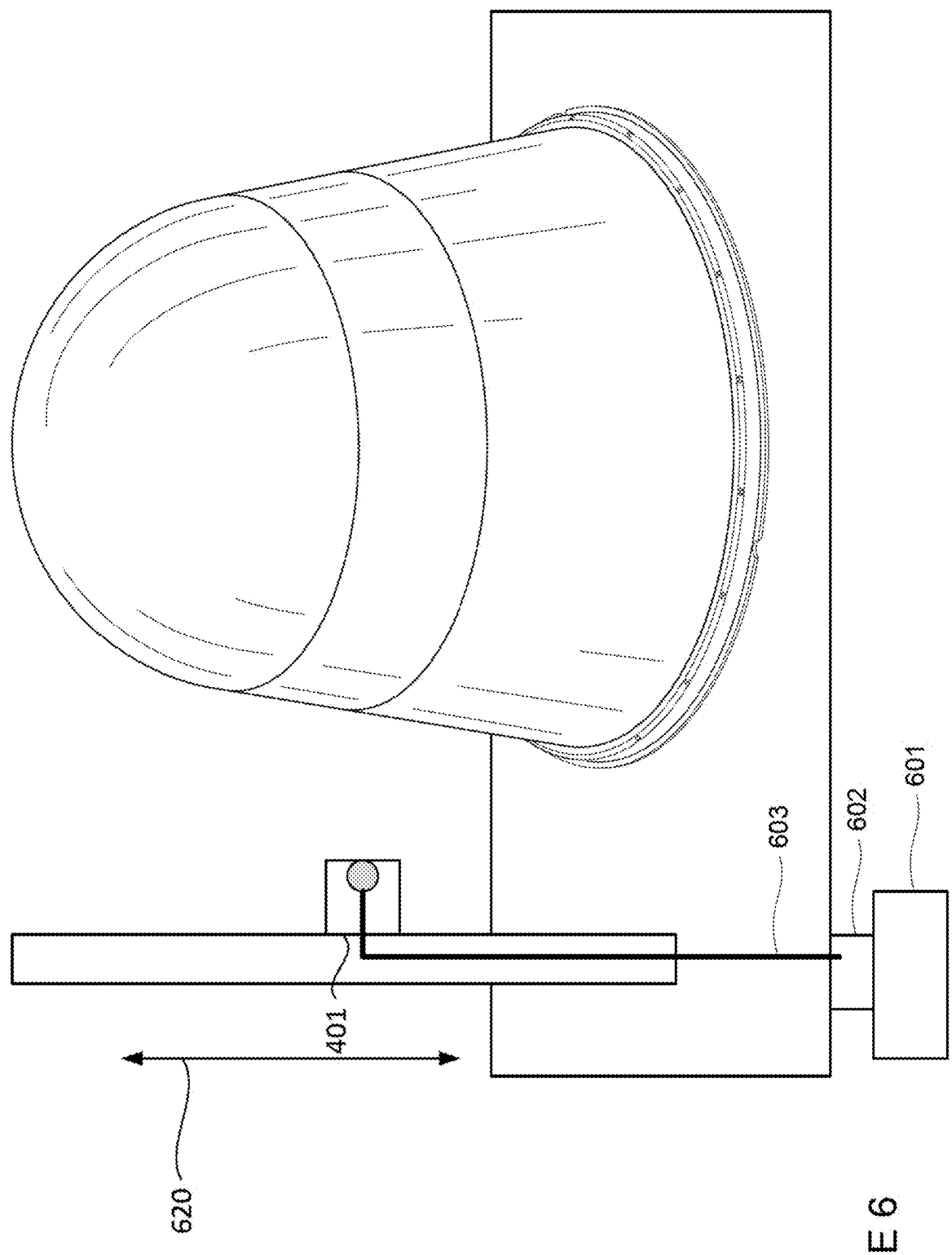

ated sprayer system

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, condensation, etc., which can cause a buildup of debris and contaminants on these sensors. Typically, the sensors include a cover to protect the internal sensor components of the sensors from the debris and contaminants, but over time, the cover itself may become dirty. As such, the functions of the internal sensor components may be impeded as signals transmitted and received by the internal sensor components are blocked by the debris and contaminants.

SUMMARY

Aspects of the disclosure provide a system for clearing a sensor cover. The system may include a sprayer; a support, wherein the sprayer is mounted to the support; and a positioning device, wherein the positioning device is configured to adjust the position of the sprayer on the support, and, wherein the sprayer is configured to direct a flow of fluid to the sensor cover.

In some instances the sprayer includes a nozzle, wherein the nozzle is positioned to direct the flow of fluid to an area of the sensor cover. In some examples, the nozzle is adjustable to direct the flow of fluid to other areas of the sensor cover.

In some instances, the system may include one or more additional sprayers. The one or more additional sprayers may be mounted on the support. In some examples the system may include one or more additional supports. The one or more additional sprayers may be mounted on the one or more additional supports. In some instances the positioning device may be a linear actuator. The linear actuator may be attached to the sprayer via an arm, wherein the arm is configured to adjust the position of the sprayer on the support.

In some instances, the support may include a plurality of grooves, and the sprayer may include a gear system, wherein the gear system is rotatable in the plurality of grooves. The sprayer may further include a turbine, wherein the turbine is configured to rotate the gear system in the plurality of grooves.

In some instances the system may further comprise a track. The support may be positioned within the track. In some instances, the system may further comprise a motor. The motor may be configured to rotate the support within the track and around the sensor cover. The support may be attached to the track and the motor is configured to rotate the track around the sensor cover.

In some instances, the system may further comprise a pump for providing the sprayer with the fluid.

In some instances, the system may further comprise an actuator, wherein the actuator may be configured to adjust the height of the support relative to the sensor cover.

In some instances, the fluid may be one or more of water, anti-freeze, detergent, gas, and soap.

In some instances, the system may further comprise a monitoring sensor, wherein the monitoring sensor is configured to detect a buildup of one or more elements on the sensor cover. In some examples, the one or more elements may be any combination of ice, snow, and condensation. In some instances, the monitoring sensor, upon detecting a buildup of one or more elements on the sensor cover, may trigger the sprayer to direct the flow of fluid on the sensor cover in the direction of the one or more elements.

BRIEF DESCRIPTION OF THE DRAWINGS

The present technology is illustrated by way of example, and not by way of limitation, in the figures of the accompanying drawings in which like reference numerals refer to similar elements including:

FIG. 4 illustrates a repositionable sprayer system in accordance with aspects of the disclosure.

FIG. 6 illustrates a repositionable sprayer system in accordance with aspects of the disclosure.

DETAILED DESCRIPTION

Figure 1:
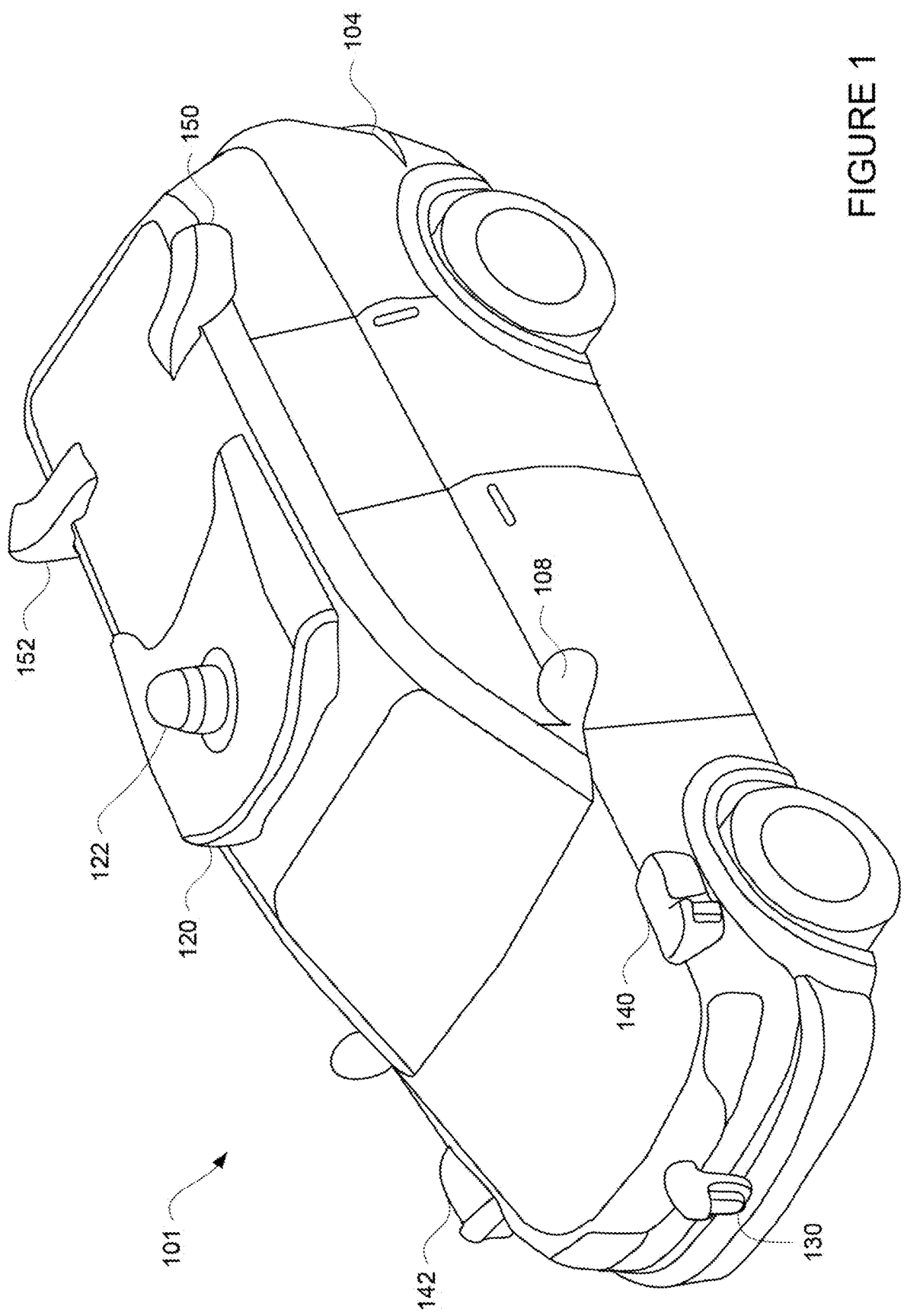
FIG. 1 shows a sensor attached to a vehicle in accordance with aspects of the disclosure.

This technology relates to removing, or otherwise preventing, environmental elements from building-up on sensors in order to assure adequate operation. The sensors may include a cover to protect the internal sensor components from elements, such as rain, snow, dust, dirt, condensation, and other such debris (collectively referred to herein as contaminants). However, the cover itself may become covered over time, such as by dirt while operating near a construction site, or snow while operating during a snow storm. Moreover, temperature differences between the interior of the sensor (i.e., within the sensor cover) and the sensor's external environment (i.e., outside of the sensor cover) may result in the formation of condensation on the sensor's cover. Thus, the functions of internal sensor components of the sensor may be impeded as signals transmitted and received by the internal sensor components may be blocked by the elements and/or condensation. These issues may be exacerbated in sensors having larger covers, as the chance for elements building-up on a larger sensor cover is greater and can be especially problematic in the case of autonomous vehicles which rely upon data generated by these sensors to make driving decisions.

Contaminants which build up on the sensor cover may be removed by providing a temporary or continuous stream of a fluid. For instance, contaminants, such as snow and ice during a winter storm, may build up on the sensor cover as the vehicle progresses on a trip. Upon, or before the contaminants have an impact the operation of the sensor's internal components, a sprayer, which may include a nozzle, positioned around the sensor cover, may provide a directed stream of fluid to spray and/or melt away the contaminants. However, for larger sensor covers, a sprayer positioned around the sensor cover may not be able to provide a stream of fluid at the distance, direction, or force needed to reach and clear the contaminants. Moreover, when the stream of fluid is applied to the sensor cover with insufficient force to effectively clear the contaminants, more fluid may be required resulting in inefficient usage of the fluid.

To address these issues, a repositionable sprayer system may align a sprayer at a location where a stream of fluid can be applied with enough force to efficiently remove contaminants. The repositionable sprayer system may include a sprayer and support. The sprayer may be moveably mounted, or otherwise attached, to the support, such that the sprayer may move up and down on the support. The sprayer may include a nozzle configured to deliver the stream of fluid to remove the contaminants.

The position of the sprayer relative to the sensor may be adjusted by a positioning device. An actuator may move the sprayer up and down the support, thereby adjusting the alignment of the sprayer relative to the sensor cover. In some instances, the positioning device may be hydraulically operated via a reduction drive and turbine. In this regard, the positioning of the sprayer relative to the sensor may be adjusted by driving a stream of fluid through a turbine, which in turn may rotate the reduction drive, which in turn may cause the sprayer to move in a first direction within the groove. The stream of fluid may be output by the nozzle of the sprayer after flowing past the turbine. When the stream of fluid ceases, the turbine may no longer be driven by the fluid and the sprayer may move in a second, opposite direction.

Multiple sprayers may be positioned on a support and more than one support may be positioned around a sensor. In this regard, each sprayer may be capable of directing a stream of fluid at the same or different areas of the sensor cover. Moreover, positioning more than one support around the sensor may allow the sprayers on one support to direct streams of fluids to portions of the sensor cover not capable of being sprayed by other sprayers positioned on different supports.

A track may be positioned around the sensor to provide a path for one or more supports to travel around the sensor. By doing such, the sprayers on the support may be capable of providing streams of fluid to multiple portions of the sensor cover.

A vehicle may have one or more sensors to detect objects external to the vehicle such as other vehicles, obstacles in the roadway, traffic signals, signs, trees, etc. For example, the vehicle 101, as shown in FIG. 1, may include lasers, sonar, radar, cameras and/or any other detection devices that capture images and record data which may be processed by computing devices within the vehicle. The vehicle's sensors, such as LIDAR, radar, cameras, sonar, or other such imaging sensors, may capture images and detect objects and their characteristics such as location, orientation, size, shape, type, direction and speed of movement, etc. Images may include the raw (i.e., unprocessed) data captured by the sensors and/or pictures and videos captured by camera sensors. Images may also include processed raw data. For instance, the raw data from the sensors and/or the aforementioned characteristics can be quantified or arranged into a descriptive function or vector for processing by the computing devices. The images may be analyzed to determine the vehicle's location, and to detect and respond to objects when needed.

The sensors may be arranged around the vehicle's exterior or interior. For example, housings 130, 140, 142, 150, 152 may include, for example, one or more LIDAR devices. The sensors may also be incorporated into the typical vehicle components, such as taillights/turn signal lights 104 and/or side view mirrors 108. In some instances one or more laser, radar, sonar, camera and/or other such imaging sensors may be mounted on the roof, such as in housing 122, attached to mount 120.

Figure 2:
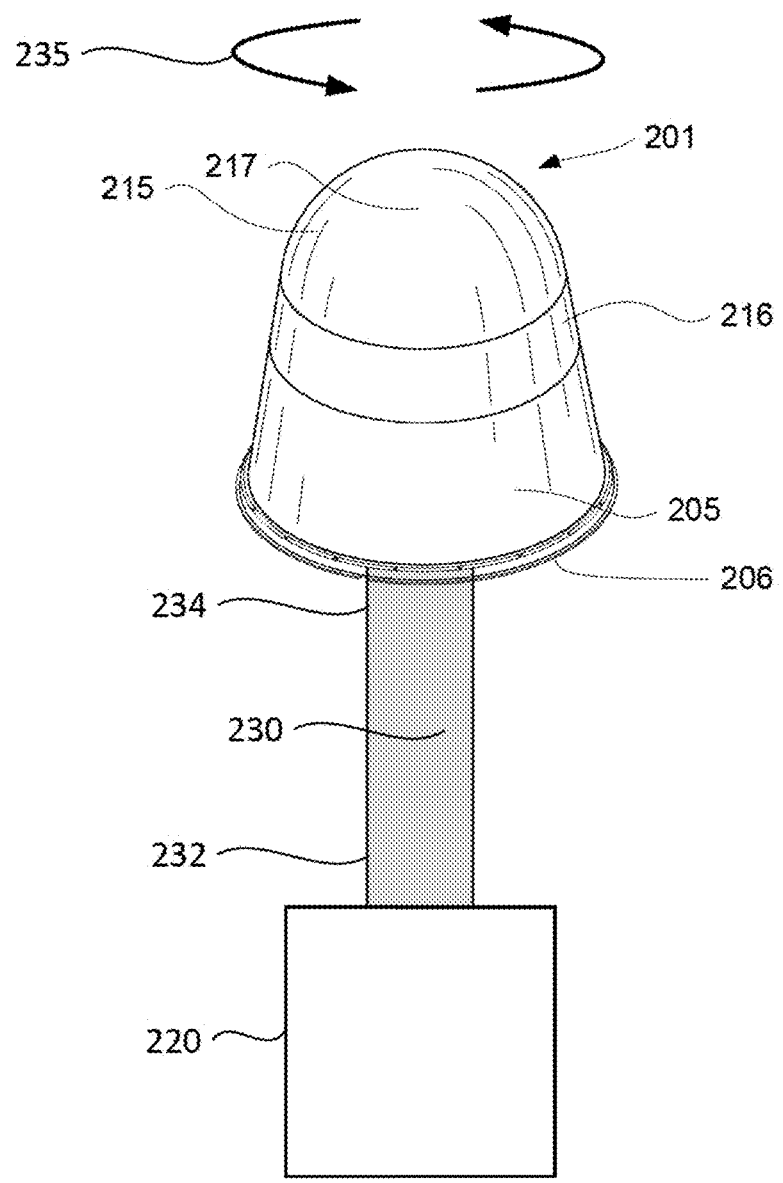
FIG. 2 illustrates a sensor cover connected to a motor in accordance with aspects of the disclosure.

A vehicle sensor may be comprised of internal sensor components, a cover for housing the internal sensor components, and a cover window. The cover window may be constructed at a specific location on the sensor cover and the internal sensor components may transmit and receive one or more signals through the cover window. The sensor cover may be configured in various shapes and sizes, such as spheres, cylinders, cuboids, cones, prisms, pyramids, cubes, etc. For instance, as shown in FIG. 2, the sensor cover 215 of sensor 201 may be configured such that it has a domed shaped portion 217 with a side wall 205 in the shape of a frustum. The sensor cover 215 may be comprised of materials such as plastic, glass, polycarbonate, polystyrene, acrylic, polyester, etc.

As noted above, the cover may include a cover window through which the internal sensor components may transmit and receive signals. For instance, as further shown in FIG. 2, the side wall 205 of the sensor cover 215 may include a cover window 216 incorporated therein, to allow signals (not shown) to penetrate the sensor cover 215. Although the cover window 216 is shown as being only a portion of the sidewall 205, in some instances the entire sidewall 205 may be constructed as a cover window. Further, multiple cover windows may be positioned on the sensor cover 215. The cover window 216 may be composed of the same, or different, material as the sensor cover 215. In some instances the entire sensor cover 215, or a large portion of the sensor cover, may be penetrable by the signals transmitted and received by the internal sensor components, thereby allowing the entire sensor cover 215 to function as a cover window.

The sensor may be attached to a motor via a sensor shaft. For instance, as further shown in FIG. 2, the sensor shaft 230 may include a first end 232 and a second end 234. The first end of the of a sensor shaft 232 may be attached to a sensor motor 220 and the second end of the sensor shaft 234 may be connected to the sensor 201 and sensor cover 215, such as at the base 206 of the sensor cover. In this regard, the first end of the sensor shaft 232 may be attached to the motor 320 via a belt, gear, chain, friction roller, etc. The motor 220 may rotate the sensor shaft 230 in the first direction 235 causing the entire sensor 201 to also rotate in the first direction 235. In some embodiments the sensor shaft 230 may only rotate the sensor cover 215, and not the internal components of the sensor. The sensor 201 and motor 220 may each be located internally or externally from a vehicle.

Figure 3:
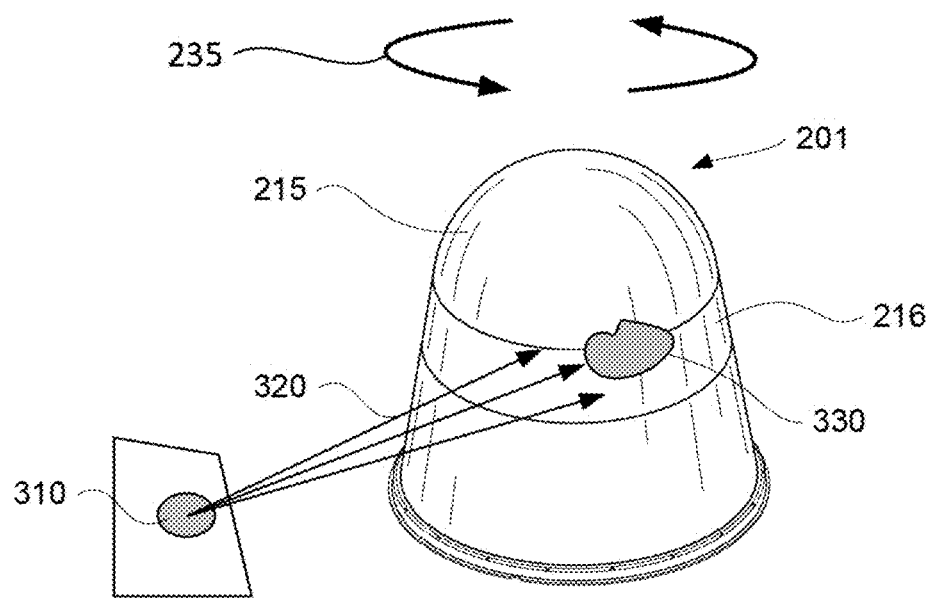
FIG. 3 illustrates a nozzle directing a stream of fluid onto a sensor cover in accordance with aspects of the disclosure.

Elements which build up on the sensor cover may be removed by providing a temporary or continuous stream of a fluid. For instance, contaminants 330, which may represent snow and ice, dirt, mud, sand, leaves, or other such elements, may build up on the sensor cover 215 of sensor 201 as the vehicle progresses on a trip, such as during a snow and/or ice storm, as shown in FIG. 3. Upon or before the contaminants 330 impact the operation of the sensor's internal components, a nozzle 310, such as a jet nozzle, positioned in the vicinity of the sensor cover 215, may provide a directed stream of fluid 320 to spray and/or melt away the contaminants 330, as further shown in FIG. 3. The fluid may be any type of liquid such as water, anti-freeze, detergent, gas, and/or soap.

A repositionable sprayer system may align a sprayer at a location where a stream of fluid can be applied with enough force to efficiently remove contaminants and debris. The repositionable sprayer system's ability to adjust the location of the sprayer allows the sprayer to overcome issues encountered by stationary devices (e.g., nozzle 310 shown in FIG. 3), including the inability to provide a stream of fluid at the distance, direction, and/or force needed to reach and clear contaminants on sensor covers. Turning to the example of FIG. 4, a repositionable sprayer system 400 may include a sprayer 401 and support 411 positioned in the vicinity of a sensor, such as sensor 201, as shown in FIG. 4. The sprayer 401 may be moveably mounted, or otherwise attached, to the support 411, such that the sprayer may move up and down on the support, as illustrated by arrows 420. A conduit 413, such as a rubber hose, and may be positioned within the support 411. One end of the conduit 413 may be connected to a nozzle 410 positioned on and/or within the sprayer 401 to deliver fluid. In some instances the conduit 413 may be partially or fully routed to the sprayer from outside of the support.

Figure 5A:
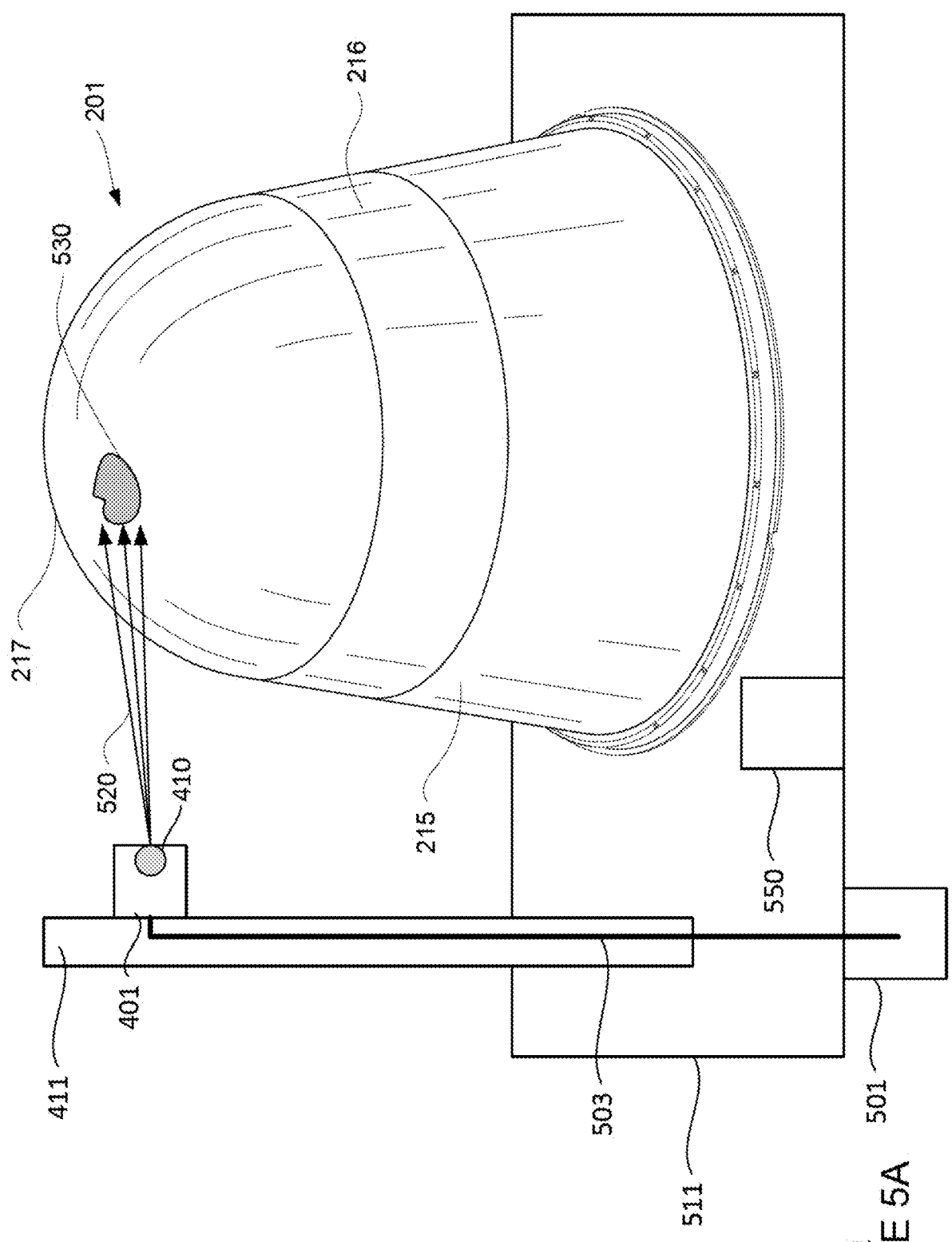
FIGS. 5A and 5B illustrate the repositioning of a sprayer in accordance with aspects of the disclosure.
Figure 5B:
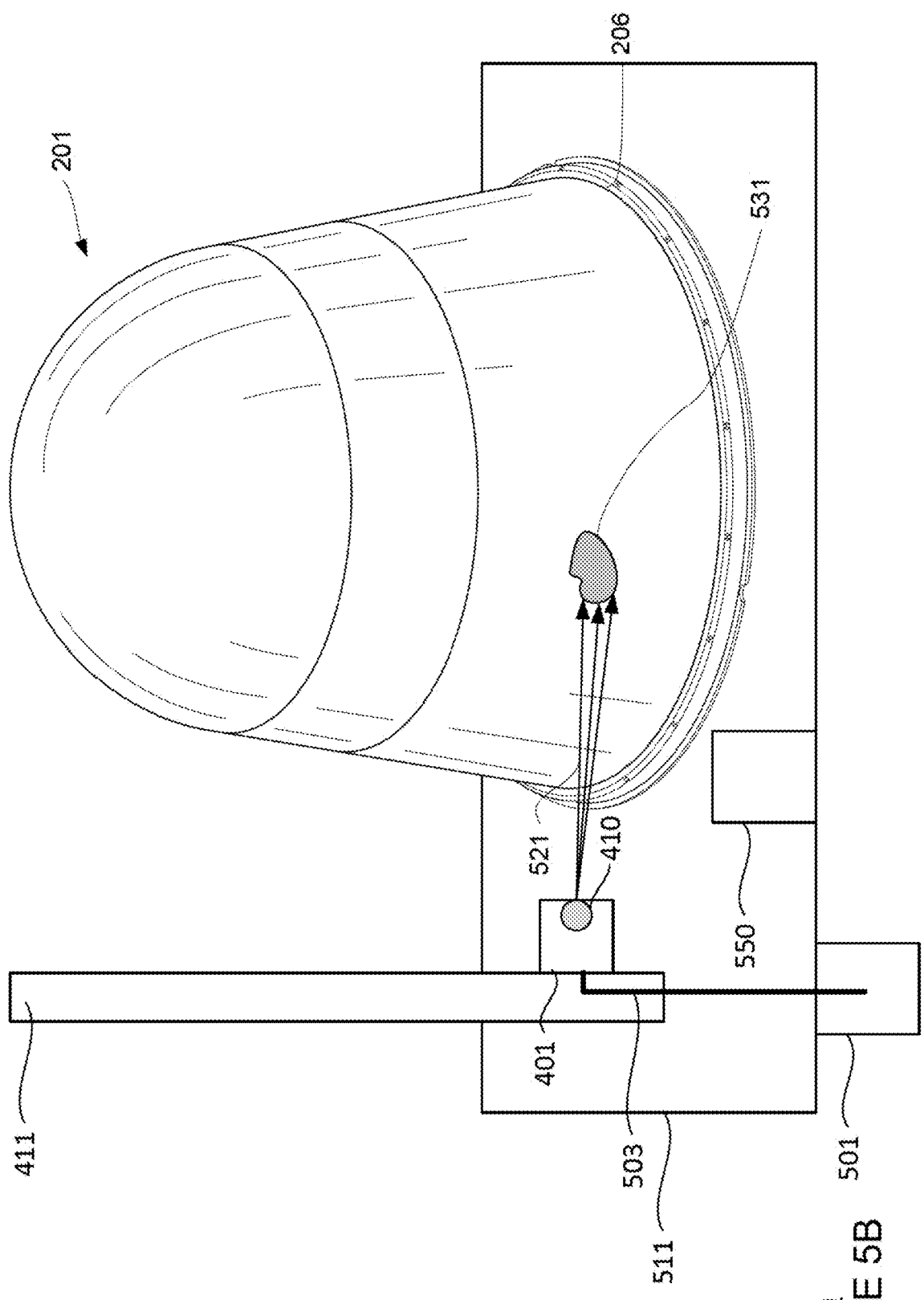

A positioning device may control the alignment of the sprayer. In this regard, the repositionable sprayer system 500 may include an actuator 501, as shown in FIGS. 5A and 5B. The actuator 501 may be a linear actuator capable of positioning a sprayer at a certain location. The actuator 501 may be attached to the sprayer 401 via an arm 503. Upon being activated, the actuator 501 may move the arm 503 towards the domed shaped portion 217 of the sensor cover, as shown in FIG. 5A, or downward toward the base 206 of the sensor cover, as shown in FIG. 5B. The sprayer 401 may move in the same direction as the arm 503 to which it is attached. Although the actuator 501 is shown as being positioned within the body of the vehicle 511 in FIGS. 5A and 5B, the actuator may be positioned outside of the body of the vehicle, within the support, and/or within the sprayer. In some instances, the positioning drive may be a lead screw on which a carrier is attached. The carrier may be attached to one or more sprayers. A motor may rotate the lead screw, which may cause the carrier and the sprayers attached thereto to move along the lead screw. The carrier may move in an opposite direction when the rotation direction of the screw is reversed.

The alignment of the sprayer relative to the sensor cover may be based on the location of the debris to be cleared. In this regard, the actuator 501 may receive instructions from a controller, described further herein, where the sprayer 401 should be positioned to clear the contaminants. For instance, the controller may instruct the actuator 501 to position the sprayer 401 near the domed shaped portion 217 of the sensor cover to clear contaminants 530 by providing a stream of fluid 520 from nozzle 410. In another example, the controller may instruct the actuator 501 to position the sprayer 401 near the base 206 of the sensor cover to clear contaminants 531 by providing a stream of fluid 521 from nozzle 410.

Motors and other such devices capable of moving the sprayer may also be used to control the positioning of the sprayer. For instance, and as shown in FIG. 6, the repositionable sprayer system 600, which may be compared to repositionable sprayer system 400, may include a motor 601 attached to a reduction drive 602. The reduction drive may be attached to the sprayer 401 via a connection, such as arm 603. The motor may drive the reduction drive 602, which moves the sprayer 401 and/or arm 603 up and down on the support 411, as illustrated by arrows 620. The reduction drive 602 may control the rate of movement of the sprayer 401 by reducing the amount of rotational movement generated by the motor 601.

Figure 7:
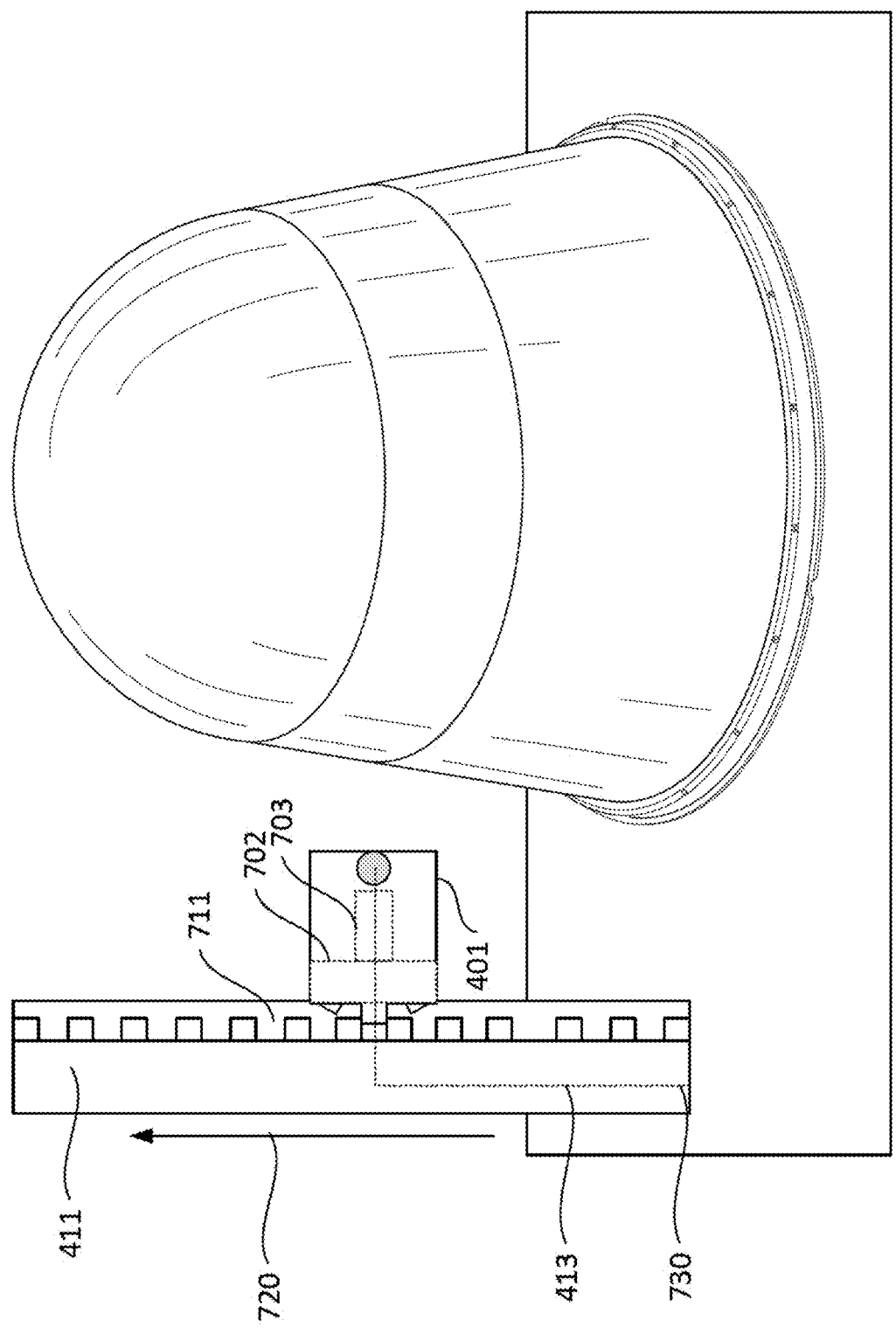
FIG. 7 illustrates a hydraulic repositioning system in accordance with aspects of the disclosure.

In some instances, the positioning device may be hydraulically operated. For instance, as shown in FIG. 7, the positioning device may include a gear system 701, such as a reduction drive attached to a turbine 703 positioned within the sprayer 401. The sprayer 401 may be attached to grooves 711 within the support 411. In this regard, one or more gears of the gear system 701 may be positioned such that they are rotatable within the grooves 711, as further shown in FIG. 7. Fluid passing through the conduit 413 may cause the turbine 703 to rotate which in turn may cause the gear system 702 to rotate. The rotation of the gear system 702 may cause the sprayer 401 to move from a resting location at the base 730 of the support in a first direction within the grooves 711, as illustrated by arrow 720. Upon the fluid be stopped from passing through the sprayer 401, the sprayer 401 may move in a second, opposite direction in the grooves 711 back to the resting position at the base 730 of the support 411.

The repositionable sprayer system may include an auto reverse function. The auto reverse function may include a switch which causes the gear box to rotate in an opposite direction upon the sprayer reaching a predefined location or locations on the support. For instance, the auto reverse function may be triggered upon the sprayer reaching a location on the support corresponding to the top of the sensor cover and again triggering upon the sprayer reaching a location on the support corresponding to the bottom of the sensor cover. In some instances, the turbine and gear box may rotate a cam (not shown) which controls the distance and direction of travel of the sprayer on the shaft. The cam may be configured to automatically change direction of the sprayer upon the sprayer reaching a certain distance on the shaft.

Figure 8:
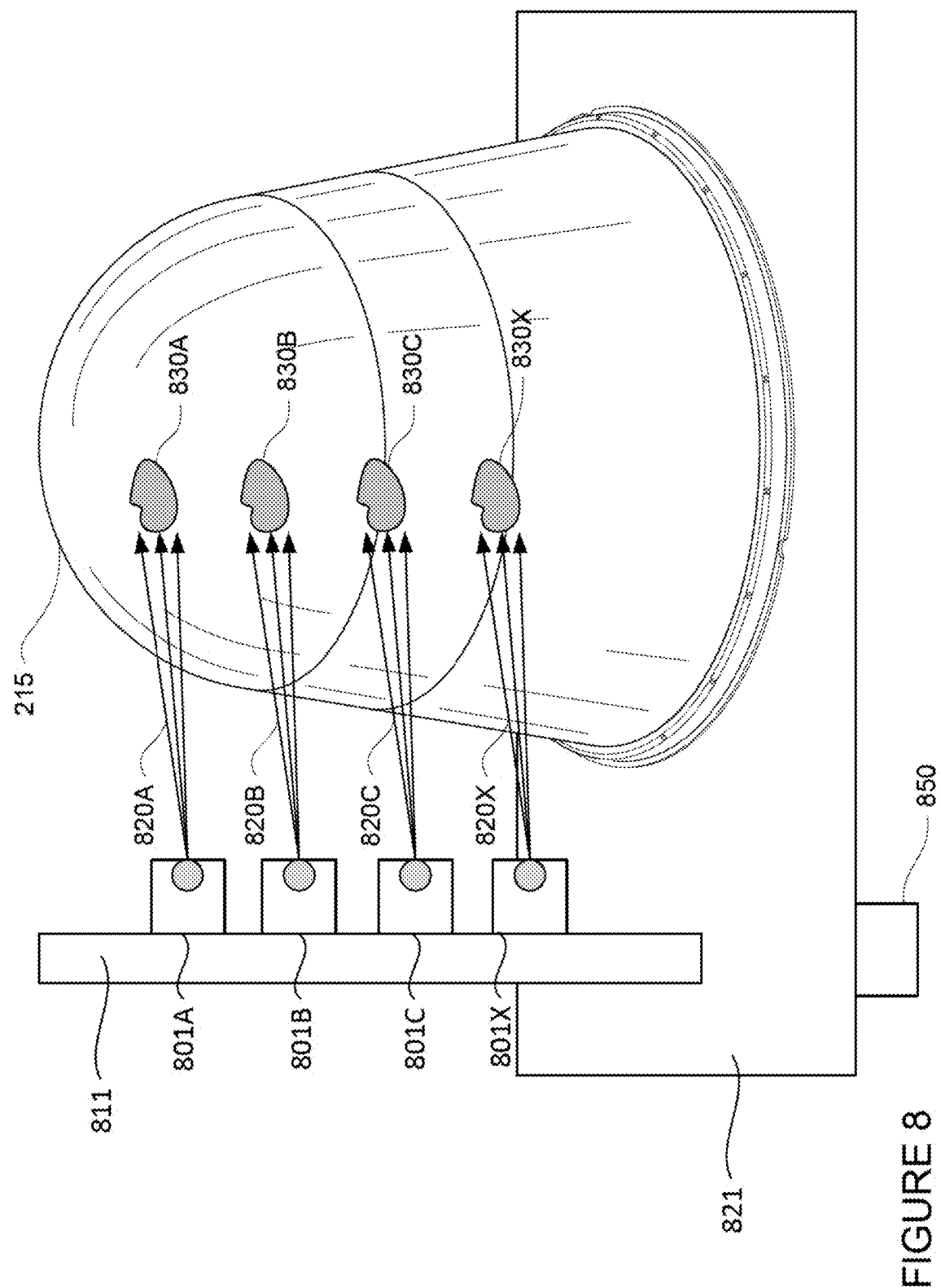
FIG. 8 illustrates a repositionable sprayer system having multiple sprayers on a support in accordance with aspects of the disclosure.

A support may include more than one sprayer. For instance, as shown in FIG. 8, multiple sprayers, 801A-801X, may be positioned on a single support 811, which may be compared to support 411. Each sprayer 801A-801X may be capable of directing a stream of fluid at the same or different areas of the sensor cover 215. For instance, contaminants 830A-830X on the sensor cover 215 may be subjected to streams of fluid 820A-820X delivered by sprayers 801A-801X, respectively. The alignment of each sprayer 801A-801X on the support 811 may be controlled by one or more actuators, such as actuator 850. In this regard, each actuator may control the alignment of a single sprayer, pairs of sprayers, or groups of sprayers. In some instances, motors may be used in place of the actuators. Although the actuator 850 is shown as being positioned within the body of the vehicle 821 in FIG. 8, the actuator may be positioned outside of the body of the vehicle and/or within or attached to the support 811 or sprayers 801A-801X.

Figure 9:
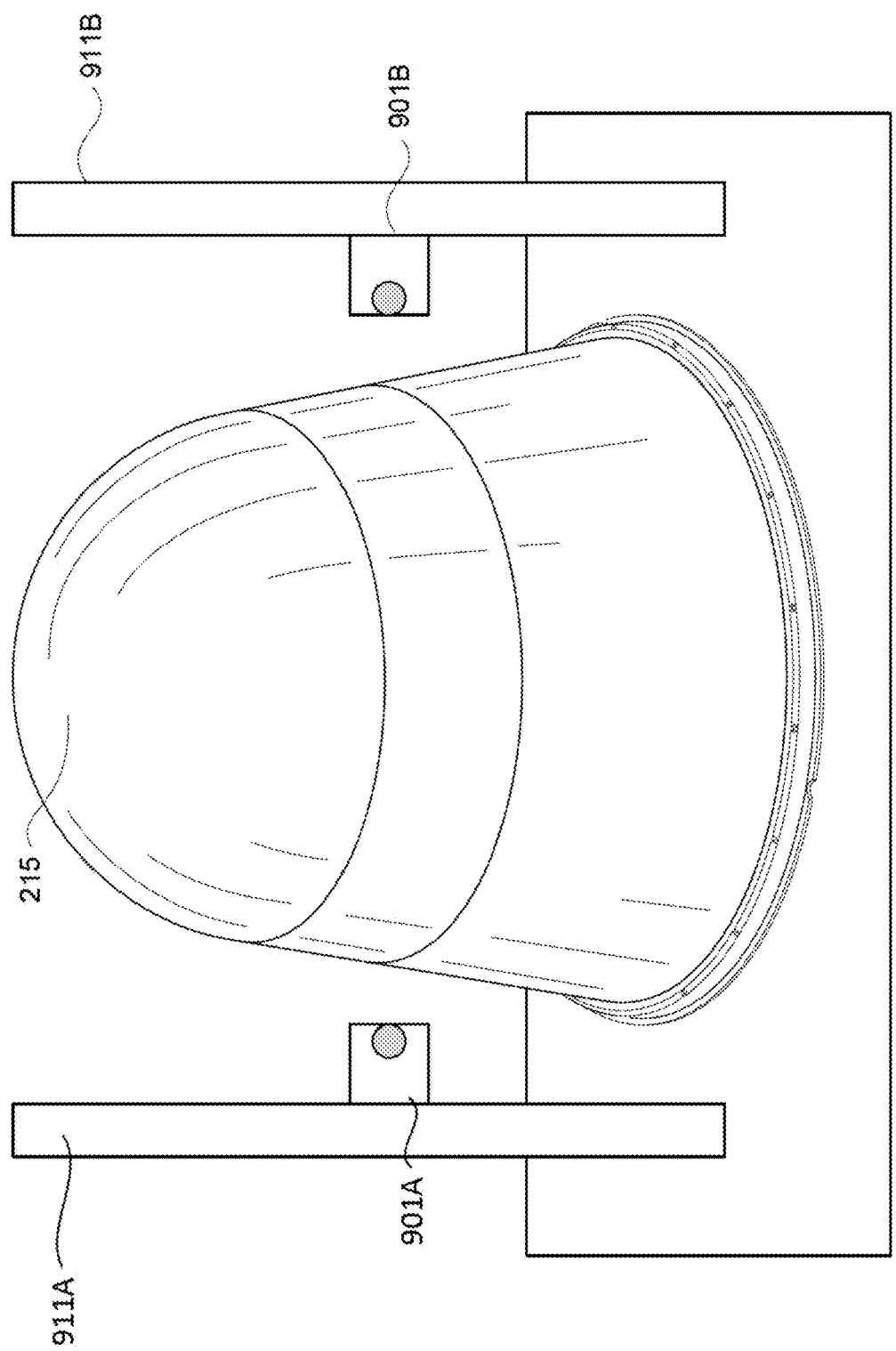
FIG. 9 illustrates a repositionable sprayer system having multiple supports in accordance with aspects of the disclosure.

More than one support may be positioned around a sensor cover. For example, FIG. 9 shows two supports 911A and 911B, which may be compared with support 411, positioned on opposite sides of a sensor cover 215. The sprayers on each support 901A and 901B, which may be compared to sprayer 401, may be capable of directing a stream of fluid to the same or different portions of the sensor cover 215. In this regard, the movement of each sprayer may be controlled by one or more actuators.

Figure 10:
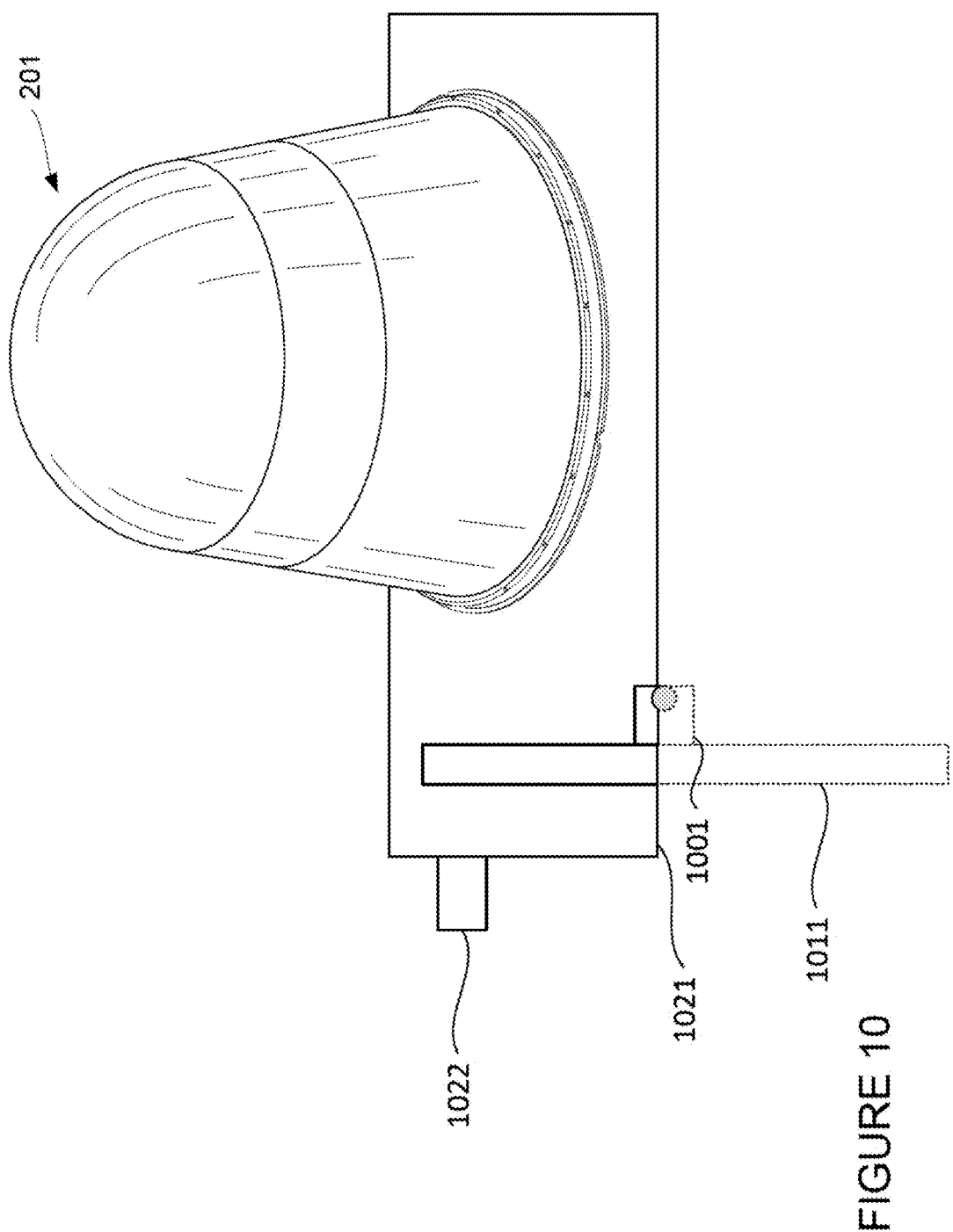
FIG. 10 illustrates a retractable repositionable sprayer system in accordance with aspects of the disclosure.

In some instances, the supports may be retracted within the body of the vehicle when not in use. In this regard, an actuator, such as the linear actuator 1022 shown in FIG. 10, may move the support 1011 and sprayer 1001, which may be compared to support 411 and sprayer 401, respectively, within the body of the vehicle 1021 when not in use to avoid interfering with operation of the sensor 201. The linear actuator 1022 may extend the support out of the body of the vehicle when the repositionable sprayer system is needed.

Figure 11:
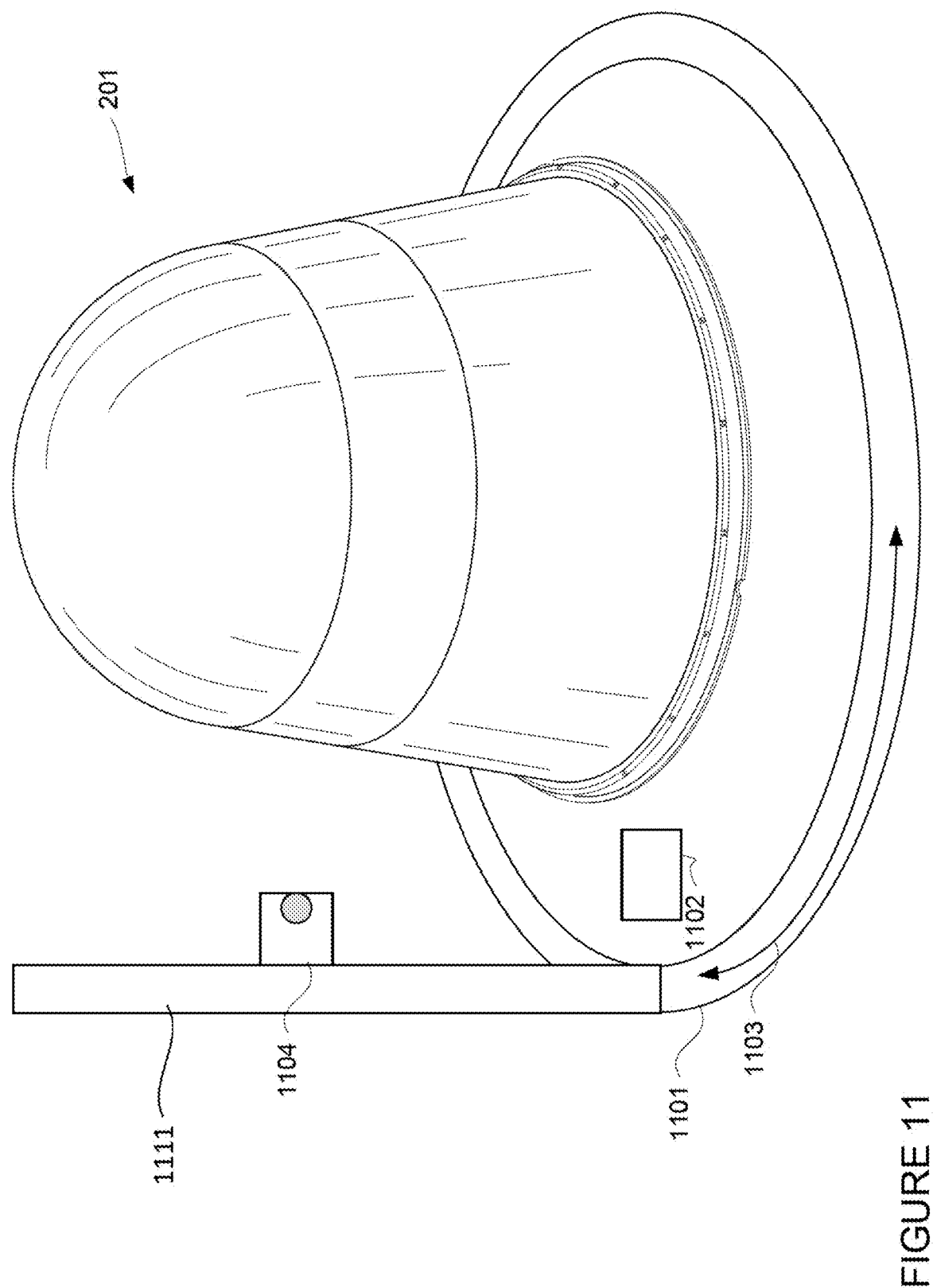
FIG. 11 illustrates a retractable repositionable sprayer system positioned in a track in accordance with aspects of the disclosure.

A track may be positioned around the sensor. The track may provide a path around a support of the repositionable sprayer system may rotate to direct the sprayer to different portions of the sensor cover. For instance, as shown in FIG. 11, a track 1101 is positioned within the vehicle's body (not shown for clarity) and the support 1111 is attached thereto. An actuator 1102 may rotate, in the directions illustrated by arrow 1103, the support 1111 within the track 1101 and/or the track itself to position the sprayer 1104, which may be compared to sprayer 401. The position of the sprayer relative to the sensor 201 may be determined by a controller, as described herein.

Figure 12:
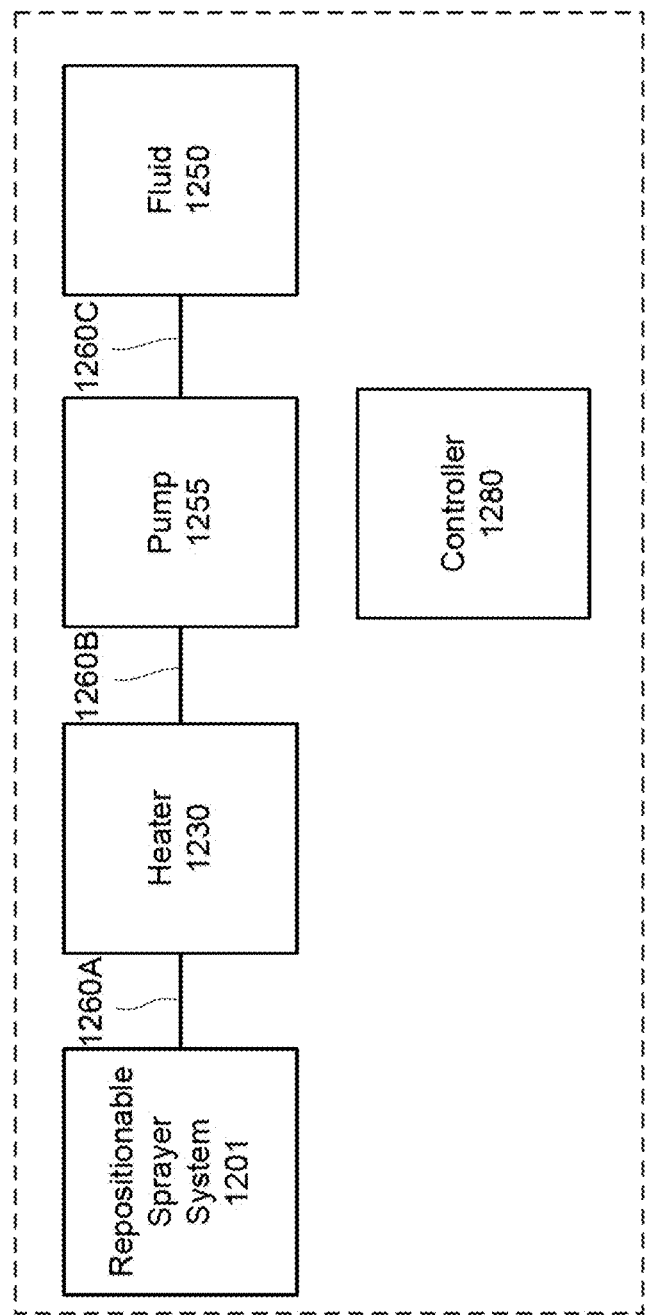
FIG. 12 illustrates a contaminant removal system in accordance with aspects of the disclosure.

The repositionable sprayer system may be part of a contaminant removal system which may include a pump to force fluid through the nozzle to deliver a stream of fluid to the contaminants. For instance, the contaminant removal system 1200, as shown in FIG. 12, may include a pump 1255 and repositionable sprayer system 1201, which may be compared to contaminant removal systems 400 and 600. The pump 1255 and repositionable sprayer system 1201 may be connected together via one or more conduits 1260A-C. The one or more conduits may be rubber, plastic, metal, or other such tubing capable of passing fluids to and from the components of the contaminant removal system. Although three conduits 1260A-C are shown in FIG. 12, fewer or more conduits may be present in the contaminant removal system. In this regard, the number of conduits may be based on the number of devices within the contaminant removal system 1200 and the number of connections required between these devices. For instance, as the number of nozzles and sprayers in the repositionable sprayer system 1201 increases, as discussed herein, the number of conduits from the pump 1255 and/or heater 1230 may be increased. Additionally, the contaminant removal system may include more than one pump and heater resulting in the need for additional conduits.

The contaminant removal system 1200 includes a fluid source 1250. In this regard, the fluid source 1250 may be a plastic reservoir, or other such container, which stores the fluid output by the repositionable sprayer system 1210. For instance, and as shown in FIG. 12, the pump 1255 may be connected to the fluid source 1250 via conduit 1260C. In some instances the pump 1255 may be positioned within the fluid source 1250. When the contaminant removal system 1200 is operated, such as through control of the controller 1280, the pump 1255 may cause the fluid to travel through the conduits 1260A-C from the fluid source 1250 to the repositionable sprayer system 1201 at a particular pressure.

The repositionable sprayer system 1201 may apply the directed stream of fluid(s) at a particular velocity to the sensor cover. In this regard, referring to both FIGS. 12 and 13, based upon the pressure of the fluid generated by the pump 1255 and the flow rate of the nozzle 410, the velocity of the directed stream of fluid 520 output by the nozzle 410 may be controlled and adjusted. In this regard, the flow rate of the nozzle 410 and the pressure generated by the pump 1255 may be increased and/or decreased to generate a particular velocity of the directed stream of fluid 1320. In some instances, directed stream of fluid may have a velocity of about 8 meter/sec, or more or less, as measured from about 25 mm away from the face of the nozzle, or more or less, to clear a sensor cover, such as sensor cover 215, from about 4 mm away from the face of the nozzle, or more or less.

The nozzle or nozzles of the repositionable sprayer system 1201 may apply the directed stream of fluid in a particular direction. In this regard, referring to FIG. 13, the direction of the nozzle 410 may be stationary or adjustable and may be set such that it sprays the directed stream of fluid on a particular area of the sensor cover. In some instances, the direction of the nozzle may be manually adjusted such that the nozzle may spray the directed stream of fluid on more than one area of the sensor cover. In some instances, the direction of the nozzle 410 may be controlled by a motor, such that the direction of the nozzle may be automatically directed to particular locations of the sensor cover, for instance, in response to an instruction from controller 1280.

In certain instances, the angle of the directed stream of fluid relative to the sensor cover may be adjusted based on the direction of the nozzle and the velocity of the directed stream of fluid. In this regard, the directed stream of fluid 1320 may contact the sensor cover 215 at a particular angle, thereby forcing the elements on the sensor cover, such as contaminants 1330 in a particular direction. For instance, the directed stream of fluid 1320 may contact the sensor cover such that the contaminants 1330 are directed up and away from the sensor window 216.

In some instances, the sensor cover may be rotated while the one or more sprayers apply directed streams of fluid. For example, as shown in FIG. 2, the sensor cover 215 may be rotated in the first direction 235. During the rotation of the sensor cover 215, a sprayer, such as sprayer 401 may direct a stream of fluid at the sensor cover 215. By doing such, the directed stream of fluid may contact an entire circumferential portion or area of the sensor cover 215, such as the entirety of the sensor window 216 or some other portion of the sensor cover.

A heater may be used to warm the fluid prior to it being sprayed onto the sensor as it travels from the pump to the nozzle. For example, referring again to the contaminant removal system of FIG. 12, a heater 1230 may be positioned between the pump 1255 and the nozzle repositionable sprayer system 1201. As the fluid travels from the pump 1255 via conduit 1260B to the repositionable sprayer system 1201 via conduit 1260A, the heater 1230 may heat the fluid. When output by the repositionable sprayer system 1201, the heated fluid may be sprayed onto elements on the sensor cover 215, such as contaminants 1330, thereby causing the debris and contaminants to be melted by the fluid, as well as blown or otherwise sprayed off. In some instances, in addition or in lieu of the heater 1230, a cooler (not shown) may be used to cool the pressurized fluid prior to being output by the nozzle. The heater 1230 may be directly connected to the fluid source, thereby heating the contents of the fluid source, such as the fluid. In some instance, the heater may be separately powered or use waste heat from other components of the vehicle, such as the drive train or electronics cooling loops. To heat or assist the heater in heating the fluid within the fluid source 1250, the fluid source 1250 may be located in a warm part of the vehicle such as in the cabin or in proximity to a heat source such as the drive train or electronics cooling loops.

Figure 13:
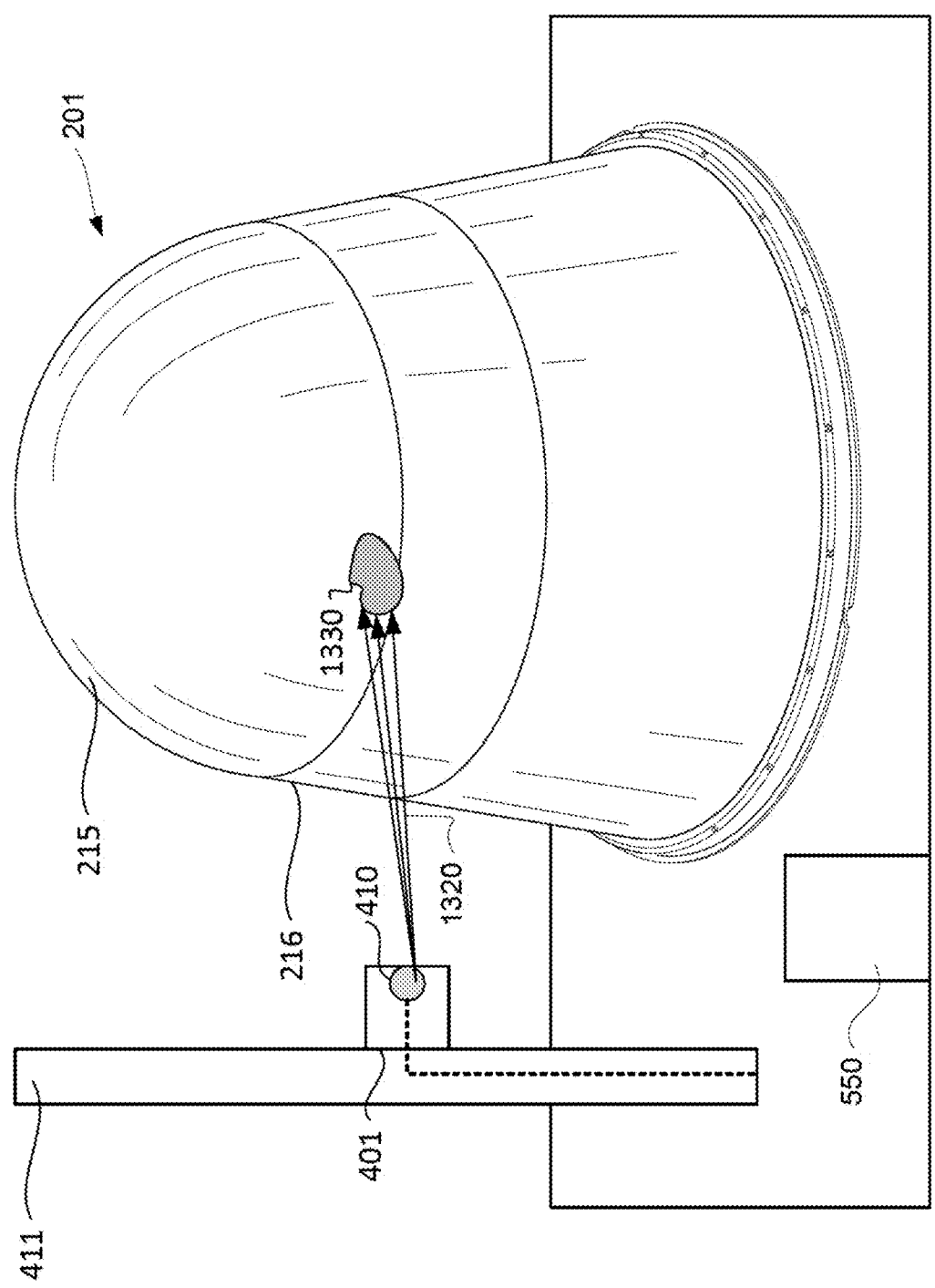
FIG. 13 illustrates a repositionable sprayer system in accordance with aspects of the disclosure.

In some instances the heated fluid may be provided to the sensor cover to prevent or remove condensation buildup. In this regard, applying a temporary or continuous stream of heated fluid to the sensor cover 215 may raise the temperature of the sensor cover, thereby preventing the formation of condensation. The heating of the sensor cover 215 may also cause any condensation on the sensor cover to evaporate more quickly. For instance, FIG. 13 shows contaminants 1330, which may be condensation, built-up on sensor window 216 incorporated into sensor cover 215 of sensor 201. A heated directed stream of fluid may be sprayed on the portion of the sensor window 216 where contaminants 1330 have built-up. By doing such, the sensor window 216 may warm up, thereby preventing the formation of additional condensation. Additionally, the heated directed stream of fluid may cause the built-up contaminants 1330 of condensation to evaporate quickly. Moreover, the heat added to the exterior surface of the cover may conduct through the sensor cover, heating the inner surface of the sensor cover leading to the evaporation of condensation from the interior surface of the sensor cover.

In some instances the directed stream of fluid may be provided to locations on the sensor cover through which the sensor captures sensor data such as images, light, etc. As discussed herein, internal sensor components may send and receive signals through sensor windows, such as sensor window 216 on the sensor cover 215. Thus, as long as the sensor window 216 remains free of buildup, the internal sensor components may continue to capture sensor data without interference from the elements or condensation. Thus, heated and/or unheated directed streams of fluid may be applied only to the sensor window 216 and/or the areas around the sensor window 216 to prevent the buildup of condensation or elements on the sensor window 216.

In some examples, additional sensors may be used to automatically determine when to apply a fluid to the sensor cover and whether the fluid should be heated. In this regard, the additional sensors, such as one or more moisture sensors or cameras located on the interior or adjacent to the exterior of the sensor cover 215, may be used to monitor the sensor cover for buildup of condensation or elements. Upon a predetermined threshold of buildup occurring, the additional sensors may trigger the application of a fluid to the cover. For instance, sensor 550 of FIG. 13 may monitor the buildup of contaminants near or on the sensor 201. Upon the buildup of contaminants meeting a predetermined threshold of buildup, the sensor 550 may trigger the controller 1280 to operate the contaminant removal system 1200, and generate an application of fluid to the cover 201.

For instance, based on a collection of images captured by one or more cameras within the sensor cover, one or more camera sensors may determine an occlusion of a portion of the sensor cover over time as a blockage within the images or a reduction in the sharpness of the image may increase. In some instances, images generated by different sensors, for example different cameras, observing the same scene can be compared to find significant differences which would indicate a problem with one of the sensor views. For example, lidar sensors may detect a sudden and persistent change in return signal intensity and timing over a region of the scene. Depending on the lidar configuration, this may be a spot or a band of change depending whether the window rotates with the sensor. A spinning lidar that sees the scene through multiple windows at alternating periods could observe a difference in scene data from one window versus another, thereby indicating a buildup where intensity is decreased.

Additional sensors may also monitor moisture levels and temperatures in and around the sensors to determine whether condensation may form. Upon determining condensation may form, the additional sensors may trigger the application of a heated fluid to the cover. In some instances, the sensor itself, or an additional sensor, may initiate the application of a fluid to the sensor cover upon determining the internal components' signals are being impeded.

Referring back to FIG. 12, the contaminant removal system 1200 may include controller 1280, such as one or more microprocessor, processors, computer devices, etc. which may control the operation of components of the contaminant removal system. In this regard, the controller 1280 may be connected to the pump 1255 and heater, as well as other components of the system, such as additional sensors described herein, such as the sensor 550 which monitors the sensor cover 215. Upon receiving a signal to engage, or determining that the system should engage based on data received from the additional sensors such as monitoring sensor 550, the controller 1280 may trigger one or more components of the contaminant removal system 1200 to engage. For instance, the controller 1280, upon determining a sensor cover, such as sensor cover 215, is covered with condensation or other elements may trigger the pump 1255 to engage resulting in the repositionable sprayer system outputting a stream of fluid on the sensor cover. Upon the sensor cover being cleared of the dirt, debris and other such contaminants, the controller may disengage the components of the contaminant removal system 1200. In some instances, the controller may receive temperature and humidity data from within the sensor cover and from the vehicle's exterior to determine whether the heater 1230 should be engaged or disengaged during the operation of the contaminant removal system. In this regard, should the ambient temperature be below a threshold, such as 40 degrees Fahrenheit, or more or less, the controller may trigger the heater to engage when the pump 1220 is engaged.

In some instances the controller may receive a signal from a manually operated input, such as a switch, button, lever, etc. In response to the received signal, the controller 1280 may engage or disengage the contaminant removal system 1200.

The features described herein may allow for continued use of a sensor even when the sensor's cover becomes dirty or wet due to the buildup of debris, contaminants, condensation, and other such elements. As such, the vehicle may continually operate in environments which produce a lot of debris and contaminants, such as outdoors in the rain or snow or at construction sites or off-road locations. In addition, less fluid may be used as bursts of fluid may be output from the sprayer which is positioned closer to the contaminants and other elements to effectively clear the sensor cover. Moreover, the features described herein may remove the need for a wiper to wipe contaminants from the sensor's cover, resulting in fewer moving parts to clear the sensor cover.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for clearing a sensor cover, the system comprising:
   a sprayer;
   a support, wherein the sprayer is mounted to the support; and
   a positioning device, wherein the positioning device is a linear actuator attached to the sprayer via an arm, wherein the arm is configured to adjust a position of the sprayer on the support, and
   wherein the sprayer is configured to direct a flow of fluid to the sensor cover.

2. The system of claim 1, wherein the sprayer includes a nozzle, wherein the nozzle is positioned to direct the flow of fluid to an area of the sensor cover.

3. The system of claim 2, wherein the position of the nozzle is adjustable to direct the flow of fluid to other areas of the sensor cover.

4. The system of claim 1, further comprising one or more additional sprayers.

5. The system of claim 4, wherein the one or more additional sprayers are mounted on the support.

6. The system of claim 4, further comprising one or more additional supports.

7. The system of claim 6, wherein the one or more additional sprayers are mounted on the one or more additional supports.

8. The system of claim 1, further comprising a pump for providing the sprayer with the fluid.

9. The system of claim 1, wherein the linear actuator is configured to adjust a height of the support relative to the sensor cover.

10. The system of claim 1, wherein the fluid is one or more of water, anti-freeze, detergent, gas, and soap.

11. The system of claim 1 further comprising a monitoring sensor, wherein the monitoring sensor is configured to detect a buildup of one or more elements on the sensor cover.

12. The system of claim 11, wherein the one or more elements are any combination of ice, snow, and condensation.

13. The system of claim 12, wherein the monitoring sensor, upon detecting a buildup of one or more elements on the sensor cover, triggers the sprayer to direct the flow of fluid on the sensor cover in a direction of the one or more elements.

14. The system of claim 1, further comprising:
   a track, wherein the support is positioned within the track; and
   a motor, wherein the motor is configured to rotate the support within the track and around the sensor cover.

15. A system for clearing a sensor cover, the system comprising:
   a sprayer, configured to direct a flow of fluid to the sensor cover;
   a support, wherein the sprayer is mounted to the support; and
   a positioning device, wherein the positioning device is configured to adjust a position of the sprayer on the support,
   wherein the support includes a plurality of grooves, and the sprayer includes a gear system, and
   wherein the gear system is rotatable in the plurality of grooves.

16. The system of claim 15, wherein the sprayer further includes a turbine, wherein the turbine is configured to rotate the gear system in the plurality of grooves.

17. The system of claim 15, further comprising:
   a track, wherein the support is positioned within the track; and
   a motor, wherein the motor is configured to rotate the support within the track and around the sensor cover.

18. The system of claim 15, wherein the sprayer includes a nozzle, positioned to direct the flow of fluid to an area of the sensor cover, and wherein the position of the nozzle is adjustable to direct the flow of fluid to other areas of the sensor cover.

19. A system for clearing a sensor cover, the system comprising:
   a sprayer;
   a support, wherein the sprayer is mounted to the support;
   a track, wherein the support is positioned within the track;
   a motor, wherein the motor is configured to rotate the support within the track and around the sensor covert; and
   a positioning device, wherein the positioning device is configured to adjust a position of the sprayer on the support, and
   wherein the sprayer is configured to direct a flow of fluid to the sensor cover.

20. The system of claim 19, wherein the support is attached to the track and the motor is configured to rotate the track around the sensor cover.

21. The system of claim 19, wherein the sprayer includes a nozzle, positioned to direct the flow of fluid to an area of the sensor cover, and wherein the position of the nozzle is adjustable to direct the flow of fluid to other areas of the sensor cover.

* * * * *